United States Patent [19]

Foody

[11] 3,734,270
[45] May 22, 1973

[54] CONVEYOR BELT

[76] Inventor: Patrick Foody, Highway 17, Hudson, Quebec, Canada

[22] Filed: July 19, 1971

[21] Appl. No.: 163,624

[30] Foreign Application Priority Data

July 24, 1970 Great Britain.....................36,125/70

[52] U.S. Cl..................................198/184, 198/204
[51] Int. Cl..............................................B65g 15/00
[58] Field of Search......................198/184, 204, 108, 198/191, 193, 201, 137

[56] References Cited

UNITED STATES PATENTS

| | | |
|---|---|---|
| 3,326,354 | 6/1967 | Aydelott...............................198/137 |
| 2,558,832 | 7/1951 | Eriksson...............................198/137 |
| 3,587,832 | 6/1971 | Robinson .............................198/184 |
| 3,593,839 | 7/1969 | Smith....................................198/184 |

*Primary Examiner*—Richard E. Aegerter
*Attorney*—R. Gordon Waldie

[57] ABSTRACT

Apparatus is disclosed for conveying bulk material, comprising a conveyor belt having integral ribs along its edges, and a frame which supports elongated rib chambers in which the ribs may slide longitudinally as the conveyor belt moves. In a preferred embodiment surfaces of the ribs are supported for frictionless movement by an air film maintained between the ribs and portions of the rib chambers defined by air-permeable sheet material through which pressurized air is passed.

12 Claims, 5 Drawing Figures

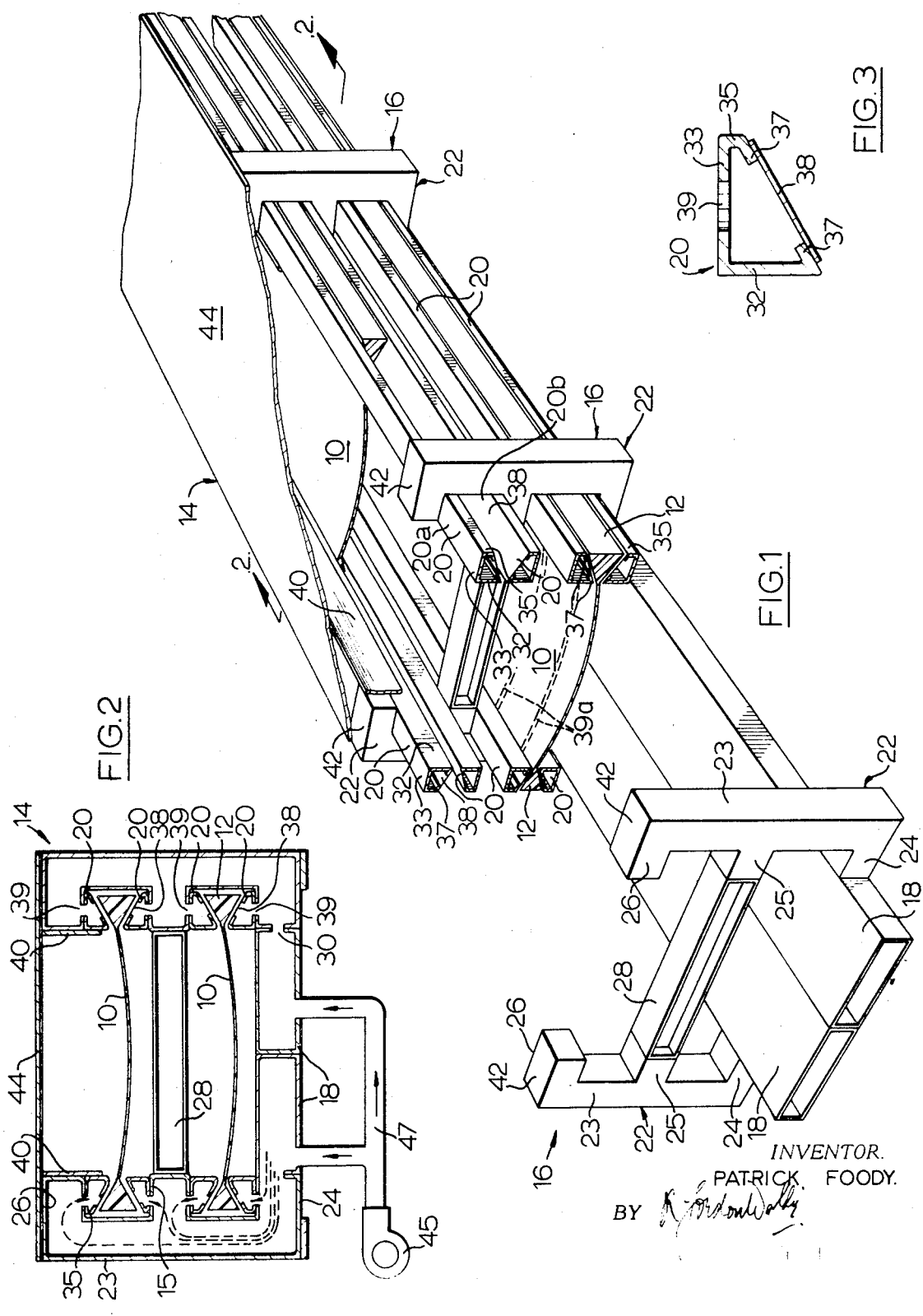

Patented May 22, 1973 3,734,270

INVENTOR.
PATRICK FOODY.
BY

CONVEYOR BELT

This invention relates generally to apparatus for conveying bulk material, and has to do particularly with a design for a moving belt and a supporting conduit within which the belt moves.

One of the applications in which the belt design of this invention can be utilized is the long-distance transportation of bulk materials, a field in which the prior art designs suffer from serious disadvantages. One conventional method of conveying bulk material over long distances employs a hollow pipe or similar conduit with a moving belt merely lying in the bottom and spanning perhaps 90° of arc. The belt is caused to slide along the bottom of the pipe by conventional belt drives placed at intervals along the pipe-line, and the energy supplied by the drive must be sufficient to make up for two essential areas of energy consumption: the friction between the belt and the pipe as the belt moves along the pipe, and the work required to raise the combined weight of the belt and the material it conveys through a given height per unit time whenever the belt is conveying material along an upward incline. Obviously, an ideal construction would be one in which the friction between the belt and the pipe were reduced to an absolute minimum, so that the work required to move a given amount of material a certain distance would be reduced. If the frictional resistance to belt movement could be minimized then the only major reason for the absorption of energy (aside from internal resistance in the drive mechanism and the rollers which transmit movement to the belt) would be the raising of material against the pull of gravity in the case of transportation on an incline.

One method being presently utilized for reducing the sliding friction between the belt and the pipe is to crack air under the belt (between the belt and the pipe) in order to approximate a kind of "air cushion" between the belt and the pipe, with air leaking out around the edges of the belt and supposedly keeping the belt edges from touching the interior pipe surface. This method, however, has a number of disadvantages of which the main one arises when the belt is not loaded. In an area where the belt has no bulk load upon it, the air pressure beneath the belt often causes the belt to become inverted or "flipped" inside the pipe, such that at the loading point the belt is not in its proper position.

Another disadvantage of the conventional method of providing a loose, moving belt lying in the bottom of a pipe or conduit relates to the fact that bulk material, particularly if it is in granular or comminuted form, will leak around the edges of the belt to lie between the bottom of the belt and the pipe, thus providing a source of excessive wear to the bottom of the belt as the latter scrapes over this granular material. Where air is cracked in under the belt the likelihood of leakage of granular material around the edges of the belt is increased, because of the tendency of the belt to float in a slightly unstable condition.

In view of the above disadvantages of conventional bulk-transportation systems, it is one object of this invention to provide a system in which bulk material can be conveyed within an enclosure in a positive manner, without leakage around the edges of the belt.

A further object of this invention is to minimize dust escape.

Another object of this invention is to permit high belt speeds without allowing the belt to swing or spill the material it is conveying.

Yet another object of this invention is to reduce longitudinal belt tension arising from the weight of the conveyed material, by providing lateral support at the edges of the belt.

A still further object of this invention is to provide a belt which can be run on a lateral incline.

A final object of this invention is to provide a belt transportation system of which one embodiment, utilizing two parallel but spaced-apart belt runs, is adapted to convey bulk material in a vertical column, at least for limited distances.

The above and other objects are accomplished in a preferred embodiment by providing an apparatus for conveying bulk material, comprising a flexible but substantially non-stretchable conveyor belt having a reinforcing rib at each edge, each reinforcing rib being defined at least in part by two rib surfaces which slope generally obliquely away from the conveyor belt in the direction away from the other reinforcing rib, and an elongated conduit within which the conveyor belt can move longitudinally, the conduit having two spaced-apart rib-supporting wall structures, each rib-supporting wall structure having a longitudinal slot adapted to receive the conveyor belt, and two air-permeable surfaces substantially complementary to said rib surfaces, one edge of the conveyor belt being lodged in each wall structure with its respective rib lodged between said two air-permeable surfaces and with the conveyor belt extending out through the slot, plenum means associated with said air-permeable surfaces, from which plenum means air can pass through the air-permeable surfaces to locations adjacent the ribs, and means for providing air under pressure to said plenum means.

Accordingly, three embodiments of this invention are shown in the accompanying drawings, in which like numerals denote like parts throughout the several views, and in which:

FIG. 1 is a partly broken-away perspective view of a bulk-conveying apparatus constructed in accordance with the first embodiment of this invention;

FIG. 2 is a cross-sectional view taken at the line 2—2 in FIG. 1;

FIG. 3 is an enlarged cross-sectional view of one component of the apparatus;

Figure 4:
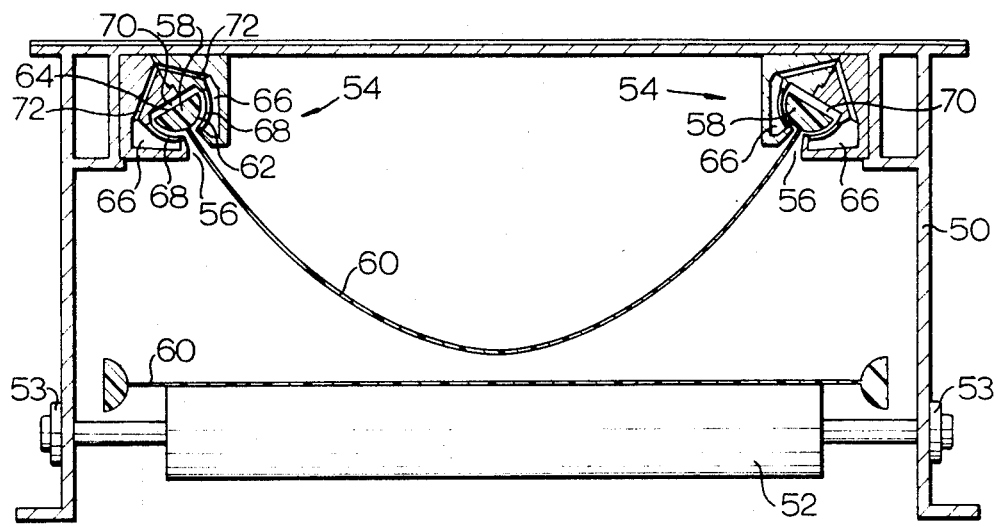
FIG. 4 is a sectional view through the second embodiment of this invention.

Attention is now directed to FIGS. 1 and 2, in which can be seen a conveyor belt 10 which like conventional conveyor belts is flexible but substantially non-stretchable, and is of conventional construction as far as the materials utilized are concerned. The conveyor belt 10 has at each edge a rib 12 of substantially triangular cross-section, as best seen in FIG. 2. One apex of the triangular rib 12 is integral with the conveyor belt 10. A conduit 14 consists of a plurality of hollow frames 16, two elongated, continuous plenum chambers 18, and four pairs of elongated angle plenums 20. Each hollow frame 16 includes two hollow E-members 22 facing each other in spaced relationship. Each E-member 22 has an upright portion 23, a lower leg 24, a middle leg 25 and an upper leg 26. The legs and the upright portion are all of substantially square cross-section and are hollow. The legs and the upright portion of a given E-member 22 all communicate with one another freely.

The two opposing E-members 22 in a given frame 16 are spaced apart by a bridging section 28 which extends between and is attached to the middle legs 25 of the two opposing E-members 22. The bridging section 28 can be merely of I-beam section, since it is only for purposes of support and does not act as a plenum or conductor of air.

The two plenum chambers 18 are of greater width than thickness, as can be seen in FIGS. 1 and 2, and placed side by side they extend between the lower legs 24 of two opposed E-members 22 of a single frame 16. The plenum chambers 18 are fixed to each other at their adjacent edges, and are secured to the lower legs 24 of the E-members 22.

Wherever one of the plenum chambers 18 abuts and is attached to a lower leg 24, there is an opening 30 at the abutment (shown in FIG. 2) which communicates the interior of the plenum chamber 18 with the interior of the E-member 22.

As shown in FIGS. 1 and 2, each of the elongated angle plenums 20 has an inner wall 32, a horizontal wall 33, an outside wall 35, and two oblique lips 37. As best seen in FIG. 3, a stiff sheet 38 of air-permeable material, such as sintered metal, is attached to and extends between the lower surfaces of the two oblique lips 37 of each elongated angle plenum 20.

As best seen in FIGS. 1 and 2, the pairs of elongated angle plenums 20 are attached in opposing relation between adjacent legs of the E-members 22. Looking at FIG. 1, the angle plenum 20a has its horizontal wall 33 attached to the undersurface of the upper legs 26, while the angle plenum 20b is inverted and has its horizontal wall 33 attached to the upper surface of the middle leg 25 of the E-members 22. In this way, the stiff sheets 38 of the angle plenums 20a and 20b are at an angle to one another, diverging outwardly (rightwardly in FIG. 1) away from the conveyor belt 10. As above mentioned, there are four pairs of elongated angle plenums 20, two pairs for each E-member 22 of a given frame 16, one pair being mounted between the upper leg 26 and the middle leg 25, the other pair being mounted between the middle leg 25 and the lower leg 24. Apertures 39 communicate the angle plenums 20 with the E-members 22.

As can be seen particularly in FIG. 2, the two surfaces of each rib 12 which form the apex with which the conveyor belt 10 is integral define an angle which is the same as that defined between the stiff sheets 38 on the pairs of angle plenums 20. The assembly shown in FIG. 1 thus defines two "tracks" for the two reaches of an endless belt, the two reaches being supported one above the other. As seen in FIG. 2, the top reach of the conveyor belt 10 is the one adapted to convey the bulk material. Where the belt 10 is intended to remain substantially horizontal as shown in FIG. 2, it is preferable to provide lateral, spring steel stiffeners 39a in the conveyor belt 10, extending between the ribs 12 at either edge. Otherwise, the weight of the bulk material on the belt will tend to cause the edges of the conveyor belt 10 to be pulled inwardly toward one another thus increasing the wedging action between the ribs 12 and the stiff sheets 38.

Vertical partitions 40 extend upwardly from the uppermost two elongated angle plenums 20 to the upper surfaces 42 of the upper legs 26 of the E-members 22. A top wall 44 is attached to the upper surfaces 42 of the E-members 22, such that the top wall 44, the two vertical partitions 40 and the upper surface of the conveyor belt 10 define an enclosed space permitting no exit of dust, etc. arising from the motion of the conveyor belt 10.

A fan 45, or other conventional means adapted to deliver air under pressure, is connected through conduit 47 to the plenum chambers 18, such that the air passes through the openings 30, and into the elongated angle plenums 20 through apertures 39 which are provided between the different legs and the angle plenums wherever there is contact between them. The air passes through the stiff sheets 38 and provides an air "cushion" which holds the triangular ribs 12 out of contact with the angle plenums 20 and the stiff sheets 38, such that frictional drag on the movement of the conveyor belt 10 is greatly reduced. FIG. 2 shows the paths followed by the pressurized air furnished to the plenum chambers 18.

Attention is now directed to FIG. 4, in which the second embodiment of this invention is shown. In FIG. 4, a frame 50 supports a series of rollers 52 for free rotation in bearings 53, and also supports two elongated enclosures 54 having slots 56. In the second embodiment of this invention, ribs 58 are provided at the edge of the belt 60, the ribs 58 being of semi-circular section, with the belt 60 integral with the ribs 58 at the mid-point of the arcuate surface 62. Each rib 58 thus has a flat surface 64 opposing the arcuate surface 62. The elongated enclosures 54 also define plenums 66, each elongated enclosure 54 having two plenums 66, one located on either side of the slot 56. As in the first embodiment of this invention, sheets 68 of air-permeable material, such as sintered metal, are provided and define a portion of the boundary of the plenums 66. As shown, the stiff sheets 68 of air-permeable material are curved in section, and are substantially complementary to the arcuate surface 62 of the ribs 58. The elongated enclosures 54 also define, between the air-permeable stiff sheets 68 a rib chamber 70 in which the ribs 58 move. The plenums 66 are fed with pressurized air through passageways 72, these latter being connected to a conventional pressurized air source through suitable conduits, etc.

In this second embodiment of the invention, the elongated enclosures 54 are positioned in such a way that the perpendicular distance between them is less than the width of the belt, thereby permitting the belt to hang or "droop" down between them. In order to permit the belt 60 to droop in the manner shown in FIG. 4, it is essential that no stiffeners be provided, such as the stiffeners 39a shown in FIG. 1. By permitting the belt to hang down to define a curve which is substantially a parabola with the focus above the belt, and by so angulating the rib chambers 70 that the belt 60 can enter the slots 56 without touching either side, the entire weight of the belt plus any load on the belt can be entirely assumed as a tensile force in the plane of the belt, this tensile force being resisted by the air film between the stiff sheets 68 and the arcuate surface 62 of the ribs 58. The advantage of the semicircular rib configuration over the triangular rib configuration has to do with the fact that the belt 60, under varying loads, will slightly change its curvilinear profile, and thus will change the direction in which it "wants" to enter the slot 56. Naturally, this direction will only change by a few degrees, and by making the width of the slots 56 several times the thickness of the belt 60, such small variations in the angulation of the belt can be accommodated without the belt touching the sides of the slot 56.

It will be appreciated, of course, that the curvilinear profile of the belt under varying loads is only approximately equated to a parabolic curve. In actual fact, under no-load conditions, the profile of the belt should approximate a catenary (which is close to a parabola), but could well depart markedly from both a parabola and a catenary under different load conditions.

The upper, curvilinear reach of the belt 60 is the load-carrying reach, and where the conveyor belt is an endless one (which is usually the case) some means must be provided for the belt to return. In FIG. 4, the returning reach of the belt 60 is shown in flattened condition below the curvilinear reach, the returning reach being supported on the series of rollers 52.

Naturally, it would be possible to support the returning reach of the conveyor belt on an air film in the same manner as the load-bearing reach, but because the returning reach carries no load, it would probably be wasteful of energy in providing the air pressure so to support the returning reach.

Figure 5:
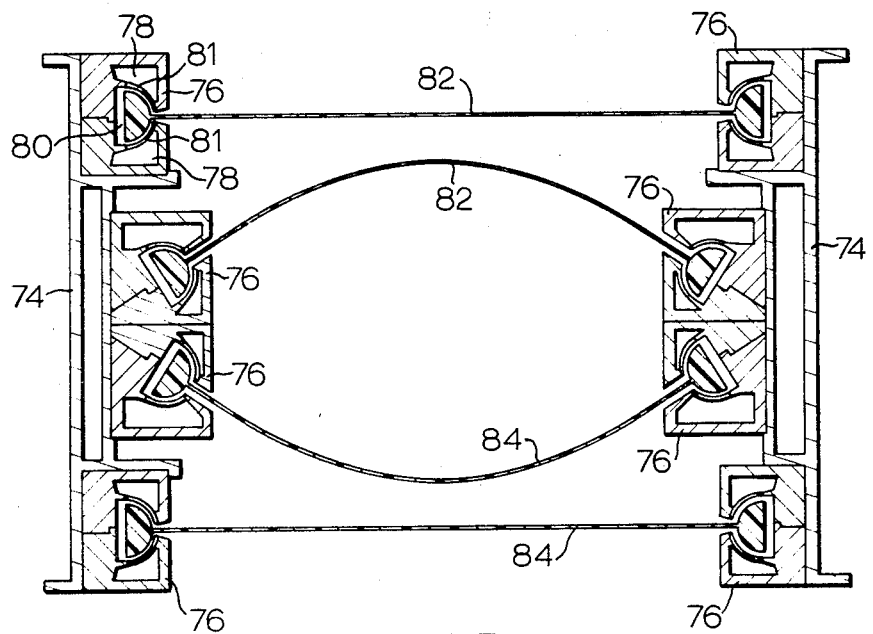
FIG. 5 is a sectional view through the third embodiment of this invention.

Attention is now directed to FIG. 5, which shows the third embodiment of this invention. In FIG. 5, two wall members 74 each support four elongated enclosures 76, arranged in pairs. Each elongated chamber 76, in turn, defines two air plenums 78, between which is a rib-supporting chamber 80, the chamber 80 being separated from each plenum 78 by a curved air-permeable sheet 81. It will be realized that the construction of each elongated enclosure 76 in FIG. 5 is similar, to all intents and purposes, to the construction of the elongated enclosures 54 in FIG. 4.

Thus, in FIG. 5, there are four pairs of elongated enclosures 76, and each pair is adapted to receive the semicircular ribs of a single reach of one belt. Hence, there are two belts, a top belt 82 of which the lower reach bears the load and the upper reach returns, and a bottom belt 84 of which the upper reach bears the load and the lower reach returns. As can be seen in FIG. 5, the load-bearing reaches of the two belts 82 and 84 are adapted to enclose between them a bulk load, such as iron ore. The assembly of FIG. 5 is not restricted to horizontal or slightly inclined installations, but is adapted to convey bulk material vertically, at least for short distances. The designations "top belt" and "bottom belt" of course do not apply in the vertical arrangement.

In order to increase the conveying ability of the load-bearing reaches of the top and bottom belts 82 and 84 in FIG. 5, the belt surfaces could be stippled in order to improve the grip on the bulk material.

It will be appreciated that a special form of this belt could be constructed in which, as seen in plan view, the conveyor belt assumed a curved configuration, thereby to permit angles and corners, etc. in an extended conduit. A further modification of this idea is to provide a very long curved belt which overlaps itself many times in such a way that it could be formed into a spiral moving progressively upwardly (or downwardly) with each turn, thereby permitting the raising (or lowering) of certain delicate materials which should not be allowed to tumble against one another and which should not be subjected to hard shocks, etc. as would be the case with a bucket conveyor.

It will be appreciated that the advantages of the construction of this invention, particularly for long-distance hauling of bulk materials, are considerable. Firstly, by the expenditure of a small amount of energy required to pressurize the air and deliver it to the plenum chambers, a relatively friction-free belt movement is obtained. In other words, the sliding friction usually encountered in systems of this kind is practically entirely eliminated, and this of course means that it requires less work to move a given amount of material over a given distance. Since this is the case, it is permissible to space the belt drives further apart on a long conveying conduit, and thus the number of such drives can be reduced, with the concomitant saving in the cost of the apparatus. Secondly, the edges of the conveyor belt 10 are always securely held in position, and there is no risk of the belt "flipping" or becoming inverted, whether it is conveying bulk material or not.

Generally, it is considered that an air pressure in the range of 2 to 3 p.s.i. is sufficient to substantially eliminate the sliding friction of the belt, however in certain applications it is possible that the pressure may have to rise to the area of 15 p.s.i. or even more. It is to be understood that this invention is not limited in any way by considerations of pressure.

While two specific cross-sectional rib profiles have been disclosed in this specification, it is to be appreciated that the practice of this invention is not dependent upon these two profiles being utilized. Obviously, a particular advantage inheres in the semi-circular rib profile, by virtue of the fact that, as above described, the variable angulation of the belt at its edges due to variation in load can be accommodated by a rotation of the ribs, at least through slight angles, without the belt touching the edges of the slots and thereby increasing friction. Such adaptability is not the case with the triangular configuration, but so long as the belt remains substantially flat through the provision of suitable stiffeners, it is not necessary to accommodate this variable angulation at the belt edges. Thus, for belts that are laterally stiffened, a large number of rib profiles, including circular or semi-circular, could be utilized. One limitation on the shape of the ribs for a laterally-stiffened belt, however, is that the surfaces which define the rib at least in part, beginning at the junction of the belt with the rib, should slope generally obliquely away from the conveyor belt in the direction away from the other reinforcing rib. The foregoing language is utilized in the appended claims, and is intended to include within its ambit triangular, semicircular, circular, polygonal and other shapes of rib which, in a general way, slope more or less obliquely away from the conveyor belt in the direction away from the other reinforcing rib.

While in preferred embodiments of this invention the ribs of the conveyor belt are supported for frictionless movement by an air film, in the embodiment of the invention shown in the Figures, particularly in the case where relatively light loads are to be carried by the belts, the air film may be dispensed with and the ribs permitted to ride on sheets 38, 68 and 81. Under these circumstances the said sheets need not be air permeable and should be constructed of or surfaced with, as should the ribs, a wear resistant, low friction material such as nylon.

What I claim is:

1. An apparatus for conveying bulk material, comprising a flexible but substantially non-stretchable conveyor belt having a reinforcing rib at each edge, each reinforcing rib being defined at least in part by two rib surfaces which slope generally obliquely away from the conveyor belt in the direction away from the other reinforcing rib, and an elongated conduit within which the conveyor belt can move longitudinally, the conduit having two spaced-apart rib-supporting wall structures, each rib-supporting wall structure having a longitudinal slot adapted to receive the conveyor belt, and two air-permeable surfaces substantially complementary to said rib surfaces, one edge of the conveyor belt being lodged in each wall portion with its respective rib lodged between said two air-permeable surfaces and with the conveyor belt extending out through the slot, plenum means associated with said air-permeable surfaces, from which plenum means air can pass through the air-permeable surfaces to locations adjacent the ribs, and means for providing air under pressure to said plenum means.

2. Apparatus as claimed in claim 1, in which each rib is of substantially triangular cross-section, with the conveyor belt joined to each rib at the apex of the triangle, the air-permeable surfaces being substantially flat and defining an angle substantially the same as the apex angle of their respective triangular rib.

3. Apparatus as claimed in claim 2, in which the air-permeable surfaces are of sintered metal.

4. Apparatus as claimed in claim 2, further including a further elongated conduit adjacent the first-mentioned elongated conduit, the conveyor belt being a continuous endless belt and being adapted to pass in one direction in said first-mentioned elongated conduit and in the opposite direction in said further elongated conduit.

5. Apparatus as claimed in claim 2, in which the conveyor belt depends curvilinearly from the ribs to define in section a substantially parabolic curve of which the focus is above the conveyor belt.

6. Apparatus as claimed in claim 2, in which the conveyor belt has a plurality of longitudinally spaced, lateral stiffening members, which maintain the conveyor belt in a substantially flat condition.

7. Apparatus as claimed in claim 1, which also comprises a further conveyor belt within said elongated conduit, both conveyor belts being substantially identical, adjacently juxtaposed, and adapted to move in the same direction, said further conveyor belt having a reinforcing rib at each edge and being supported by two rib-supporting wall structures substantially identical to said first-mentioned rib-supporting wall structures.

8. Apparatus as claimed in claim 1, in which each rib is of substantially semi-circular cross-section, with the conveyor belt joined to each rib at the mid-point of the semi-circular arc, the air-permeable surfaces being complementary to the curved surfaces of each rib.

9. Apparatus as claimed in claim 8, in which the air-permeable surfaces are of sintered metal.

10. Apparatus as claimed in claim 8, further including a further elongated conduit adjacent the first-mentioned elongated conduit, the conveyor belt being a continuous endless belt and being adapted to pass in one direction in said first-mentioned elongated conduit and in the opposite direction in said further elongated conduit.

11. Apparatus as claimed in claim 8, in which the conveyor belt depends curvilinearly from the ribs to define in section a substantially parabolic curve of which the focus is above the conveyor belt.

12. Apparatus as claimed in claim 8, in which the conveyor belt has a plurality of longitudinally spaced, lateral stiffening members, which maintain the conveyor belt in a substantially flat condition.

* * * * *